April 25, 1933.  M. F. WATERS  1,905,324
PIPE COUPLING
Filed May 9, 1930   3 Sheets-Sheet 2
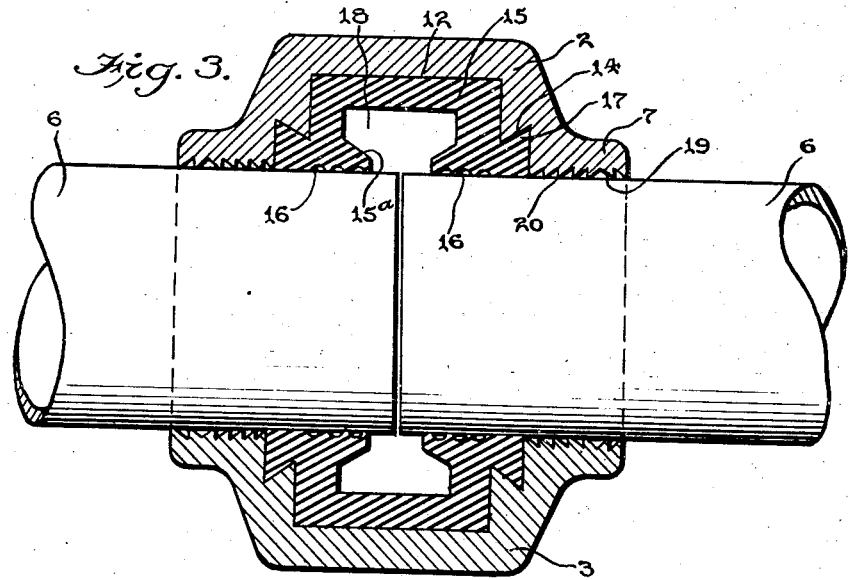
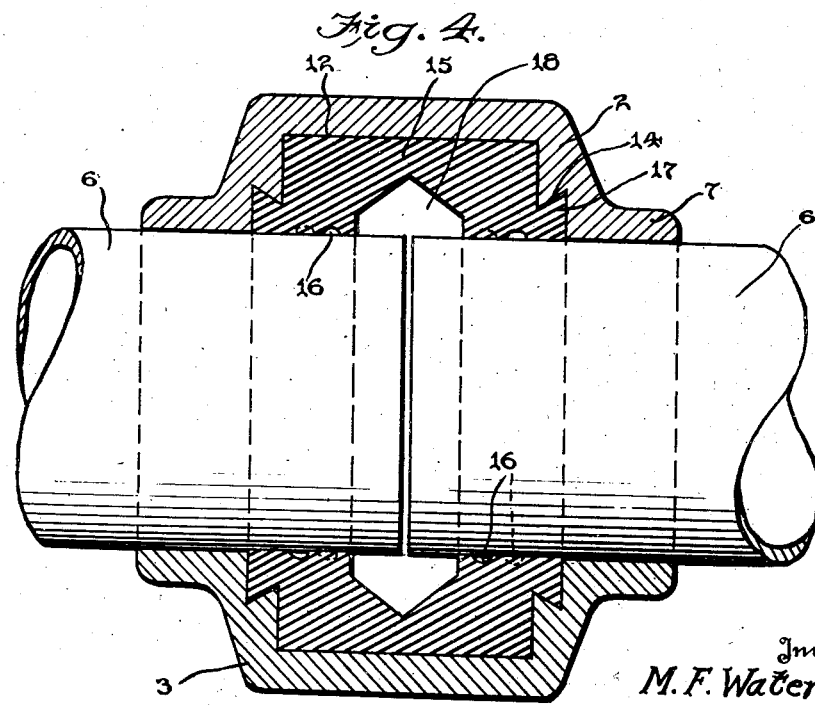
Inventor
M. F. Waters,
By George A. Prevost
Attorney April 25, 1933.    M. F. WATERS    1,905,324
PIPE COUPLING
Filed May 9, 1930    3 Sheets-Sheet 3
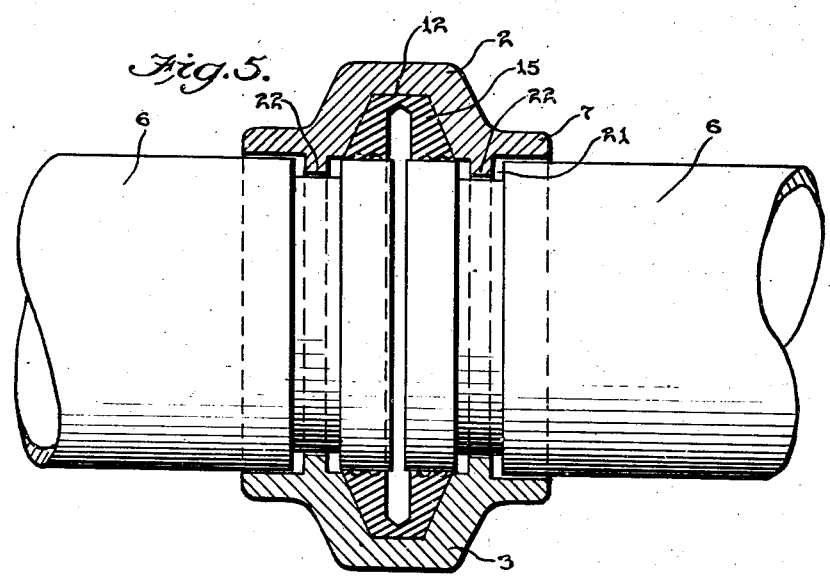
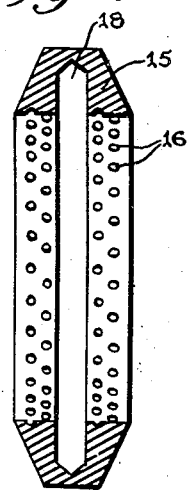
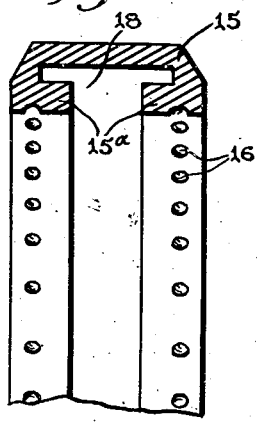
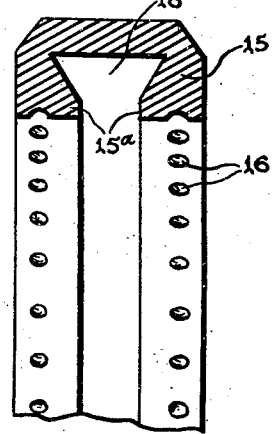
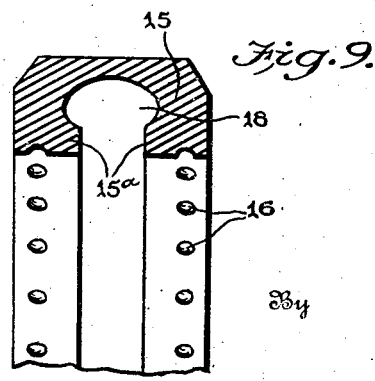
Inventor
M. F. Waters,
By George A. Prevost
Attorney Patented Apr. 25, 1933

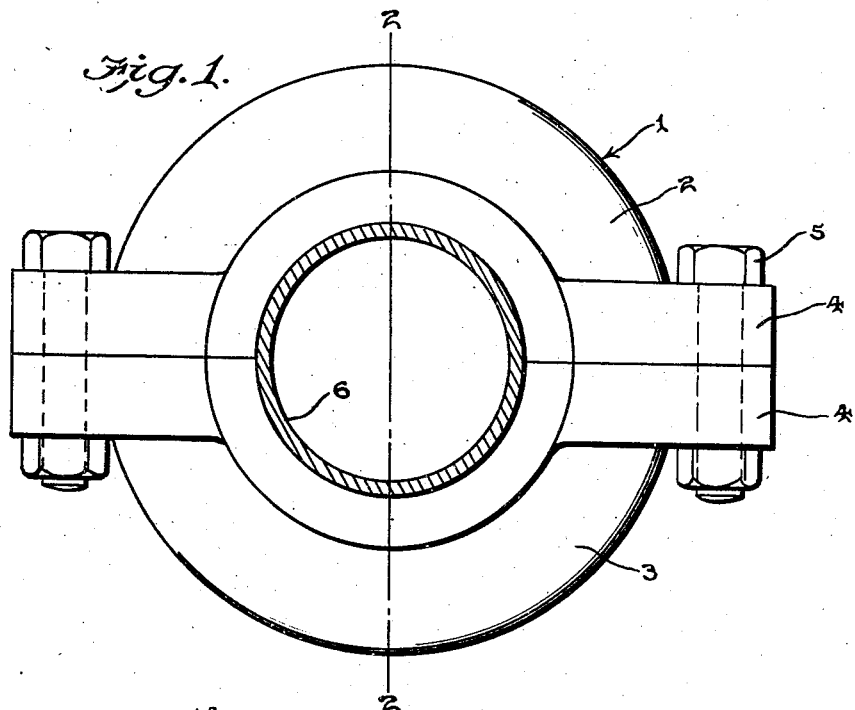
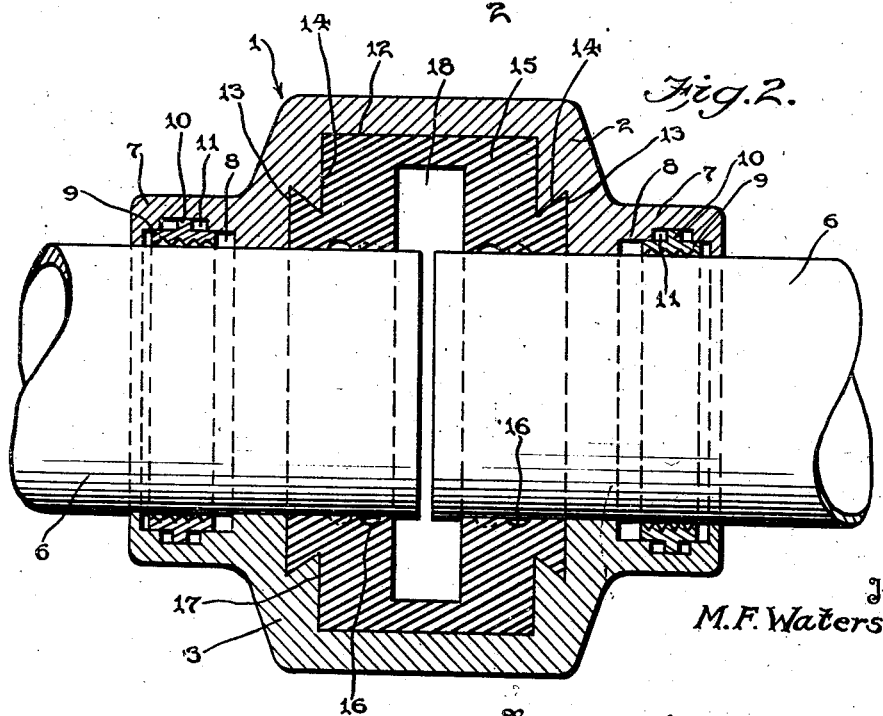

1,905,324

UNITED STATES PATENT OFFICE

MILLARD F. WATERS, OF TULSA, OKLAHOMA, ASSIGNOR TO HANLON-WATERS, INC., OF TULSA, OKLAHOMA

PIPE COUPLING

Application filed May 9, 1930. Serial No. 450,998.

My invention consists in new and useful improvements in pipe couplings or joints and is primarily intended for use in connection with a series of pipes or conduits arranged in end to end relation, its object being to secure the adjacent ends of said pipe sections together in such a manner as to insure against leakage at these points.

A further object of the invention resides in the fact that my improved pipe coupling may be applied to plane surfaced pipes, without the necessity of cutting threads in said pipes or providing flanges at the adjacent ends thereof. To this end I have provided an improved leak-proof ring or gasket having an internal annular pressure chamber located centrally thereof, which bridges the adjacent ends of two pipe sections, the inner periphery of said ring, on either side of said pressure chamber, or the pipe engaging surfaces thereof, being provided with a series of vacuum cups or recesses, which when said ring is compressed around the sections of pipe, will tightly engage the same and prevent leakage.

A still further object of my invention is to provide an improved housing adapted to cooperate with the leak-proof ring above referred to, to serve as an expansion joint, whereby adjacent sections of pipe may be permitted a limited longitudinal movement as well as lateral movement, caused by contraction, expansion or settling of the pipe line, without breaking the seal or causing an undue strain at the points of connection.

With the above and other objects in view which will appear as the description proceeds, my invention consists in the novel features herein set forth, illustrated in the accompanying drawings, and more particularly pointed out in the appended claims.

Referring to the drawings in which numerals of like character designate similar parts throughout the several views, Figure 1 is a view in side elevation showing the housing in place on a section of pipe.

Figure 2 is a sectional view taken on line 2—2 of Figure 1, showing one form of my invention as applied to an expansion joint.

Figure 3 is a similar view of a modification in the form of a rigid joint.

Figure 4 shows another form of expansion joint.

Figure 5 shows one form of my invention as applied to a flexible expansion joint, and Figures 6, 7, 8 and 9 show various modifications of the leak-proof ring structure.

In the drawings, 1 represents a housing comprising two substantially semi-circular hollow sections 2 and 3, provided with the usual abutting flanges 4, apertured to receive bolts 5 for securing the same together around two adjacent sections of pipe 6.

In the expansion type of joint shown in Figure 2, the opposite ends of the housing sections are extended longitudinally of the pipe sections to form annular flanges or collars 7, the inner faces of which are recessed as at 8 to receive a set of toothed jaws 9. These jaws are of less width than the recesses 8 and are slidably carried in said recesses by means of suitable key sections 10 engaging slots 11 in the annular wall of each recess 8, whereby when said jaws are rigidly clamped around adjacent pipe sections, the latter are allowed a limited longitudinal movement toward or away from one another without effecting the grip of the jaws 9.

Each of the housing sections 2 and 3 are hollowed out to form semi-circular gasket chambers 12, the opposite radial walls of which are recessed as at 13 to form inwardly and axially inclined shoulders 14, the purpose of which will be hereinafter set forth.

15 represents my improved gasket or leak-proof ring which is preferably composed of rubber or a rubber composition, but may be made of any suitable material, according to the type of conduit or pipe line to which the coupling is to be applied. The ring is circular in form and is of a smaller inside diameter than the outer diameter of the pipe with which it is to be employed, the inner periphery of said ring being provided with a series of vacuum cups or recesses 16, which in the modification shown in Figure 2, are arranged in two rows in staggered relation. The outer diameter of said ring is slightly greater than the diameter of the inner walls of the gasket chamber 12, the outer radial walls of said ring being provided with complementary recesses 17 adapted to be engaged by the shoulders 14 on the inner walls of the housing.

The ring 15 is provided centrally with an annular recess or pressure chamber 18, which when said ring is applied at the junction of two sections of pipe, bridges the junction between the two adjacent sections. The pressure carried in the pipe line, entering the chamber 18, tends to compress the ring against the housing and pipe sections to seal the joint.

In applying the ring to the pipe sections, it is necessary to stretch the same over the ends of the pipe because of the smaller diameter of the ring. This will obviously create a vacuum in the cups or recesses 16 and cause the inner periphery of the ring to tightly engage the adjacent ends of the pipe sections on either side of the chamber 18 and when the housing sections 2 and 3 are clamped around said ring, the latter is further compressed from the outside, due to the difference in diameters of the two elements as before stated.

It will be noted that the angularly disposed shoulders 14, engaging complementary recesses 17 in the gasket, will lend further compression to the latter at these points and retain the ring definitely in place.

In the modification shown in Figure 3, I have illustrated the manner in which my invention may be applied to a rigid joint. In this embodiment, instead of the slidable jaws 9, I employ two sets of oppositely disposed angular teeth 19 and 20 integral with each of the semi-circular collars 7 of the housing sections, whereby when said sections are clamped around adjacent pipes, said pipes are prevented from longitudinal movement in either direction.

The other features of this structure are identical with that heretofore described with the exception of the gasket or ring 15. In Figure 3 I have shown this ring provided with inwardly projecting annular flanges 15a, and an additional row of vacuum recesses, whereby the pressure within the pipe sections functions to maintain the flanges 15a in engagement with said pipe sections, to assist in sealing the joint.

In Figure 4, I have shown another form of expansion joint, wherein I have eliminated all teeth and merely extended the collars 7 longitudinally of the pipe sections. With the exception of the jaws and the specific shape of the walls of the pressure chamber 19, the embodiment shown in Figure 4 is identical with that illustrated in Figure 2. In this structure it will be noted that the outer walls of the chamber 18 converge away from the center of the chamber and are inclined toward the inner periphery of the ring.

The embodiment shown in Figure 5 comprises a coupling for use in connection with grooved pipe wherein a substantially flexible joint is required. Referring to this figure it will be seen that the adjacent ends of the pipe sections 6 are provided with annular grooves 21 on the outer face of the pipe, the housing sections 2 and 3 being provided with inwardly projecting annular shoulders or rings 22 which engage said grooves 21 and act as key sections or stops for limiting the movement of the pipes. The collars or flanged extensions 7 of the housing sections lie along the outer walls of the pipes and are of a sufficient length to cooperate with the rings 22 and grooves 21 to support the pipe sections and prevent undue strain on any one point in the pipe if the same becomes out of alignment. It will be noted that these extensions 7 are spaced apart from the pipes a sufficient distance to permit a slight relative movement of the pipe sections.

In this structure it will be noted that the shape of the gasket chamber 12 is somewhat different from those heretofore described, and that the shape of the ring or gasket 15 is also altered to conform thereto. Instead of the shoulders 14 and recesses 17 in the gasket chamber and gasket respectively, in this embodiment I have shown the radial walls of the chamber 12 and ring 15, inclined away from the center and toward the axis of the ring 15, the remaining structure of the ring being substantially the same as those heretofore described, said ring being shown in detail in Figure 6.

In Figure 7 I have shown a detail sectional view of a modified form of ring wherein the pressure chamber 18 is substantially T-shaped in cross section, the inner periphery of said ring being provided with a single row of vacuum cups 16. Figure 8 is a further modification of the ring structure having a pressure chamber 18 with upwardly and outwardly inclined radial walls, and Figure 9 shows a still further modification with the pressure chamber 18 substantially circular or elliptical in cross section.

It will be noted that in all three of these last mentioned rings or gaskets, the walls of the pressure chamber are particularly adapted for facilitating the sealing of the inwardly projecting flanges 15a around the pipe sections.

From the foregoing, it is believed that my invention may be clearly understood by those skilled in the art without further description, it being borne in mind that numerous changes may be made in the details of construction without departing from the spirit of the invention as set forth in the following claims. For instance, while I have shown the vacuum cups or recesses 16 as circular, they may be square, rectangular, diamond-shaped or any other suitable design, with equal effect, and it is obvious that various other specific designs of pressure chambers may be utilized in connection with my invention.

What I claim and desire to secure by Letters Patent is:—

1. A pipe coupling comprising a housing formed of a plurality of sections, each of said sections being recessed to house a leak-proof ring, a leak-proof ring of slightly greater outside diameter than the diameter of said recesses adapted to bridge the junction of two pipe sections, the radial walls of said housing being provided with axially inclined shoulders, and corresponding recesses in said ring to register with said shoulders, whereby when said housing sections are clamped together around said ring and pipe sections, said ring is compressed and definitely retained in place.

2. A pipe coupling comprising a housing formed of a plurality of sections, each of said sections being recessed to house a leak-proof ring, the radial walls of said recesses being provided with axially inclined shoulders, a leak-proof ring of slightly greater outside diameter than the diameter of said recesses and provided centrally with an annular pressure chamber adapted to bridge the junction of two pipe sections, the inner periphery of said ring on each side of said pressure chamber being provided with a series of vacuum cups adapted to engage and seal the outer surfaces of the adjacent ends of said pipe sections, the outer edges of said ring being recessed to register with said axially inclined shoulders, whereby when said housing sections are clamped together around said ring and pipe sections, said ring is compressed and definitely retained in place.

3. A pipe coupling comprising a sectional housing provided with a centrally located annular cavity adapted to receive a leak-proof ring, a resilient leak-proof ring enclosed in said cavity and adapted to bridge the junction of two pipe sections arranged in end to end relation, said ring adapted to snugly engage the peripheries of the adjacent ends of said pipe sections, the opposite end walls of said housing being extended longitudinally of said pipe sections beyond the extremities of said leak-proof ring, to form substantially elongated annular stop collars, the inner peripheries of said collars being spaced a predetermined distance from the peripheries of the respective pipe sections, said intervening space being unobstructed to permit a limited relative movement of said pipe sections without undue strain on the coupling, ring or sections.

4. The combination with two sections of pipe arranged in end to end relation, a coupling comprising a sectional housing provided with a centrally located annular cavity adapted to receive a leak-proof ring, a resilient leak-proof ring enclosed in said cavity and bridging the junction of said pipe sections, an annular recess in the outer periphery of each of said pipe sections, annular projections on said housing, one arranged at either side of said ring and adapted to register with the annular recess in the respective pipe section, said annular ring being of lesser transverse dimension and depth than the transverse dimension and depth of said annular recess, the opposite end walls of said housing being extended longitudinally beyond said annular projections to form substantially elongated annular stop collars, the inner peripheries of said collars being spaced a predetermined distance from the outer peripheries of said pipe sections, said intervening space being unobstructed to permit a limited relative movement of said pipe sections without undue strain on the coupling, ring or pipe sections.

In testimony whereof I affix my signature.

MILLARD F. WATERS.